United States Patent Office 3,275,712
Patented Sept. 27, 1966

3,275,712
PRODUCTION OF IMPACT-RESISTANT THERMO-
PLASTIC MOLDING MATERIALS
Hans Peter Siebel, Limburgerhof, Pfalz, and Hans-Werner
Otto, Ludwigshafen (Rhine), Germany, assignors to
Badische Anilin- & Soda-Fabrik Aktiengesellschaft,
Ludwigshafen (Rhine), Germany
No Drawing. Filed Dec. 12, 1963, Ser. No. 329,993
Claims priority, application Germany, Dec. 19, 1962,
B 70,056
6 Claims. (Cl. 260—876)

The present invention relates to a process for the production of impact-resistant molding materials which are distinguished by particularly good resistance to aging, combined with good physical properties and processability.

Many impact-resistant molding materials and methods for their manufacture are known. These molding materials are in general mixtures or copolymers of monomers forming hard and brittle polymers and those having relatively low second order transition temperatures which lie below 20° C., preferably below 0° C.

Impact-resistant polystyrene may be prepared by polymerizing styrene in the presence of a rubber component or elastomeric polymers or by mixing polystyrene with natural or synthetic rubber. Impact-resistant polymers are obtained which do not however exhibit satisfactory surface hardness in all cases. In addition to styrene, mixtures of styrene and acrylonitrile have therefore been polymerized in the presence of elastomeric polymers. In this way the surface hardness is improved and at the same time an improvement is achieved in the solvent resistance and resistance to weathering.

Copolymers of styrene and acrylonitrile are also known which are glass clear but not impact-resistant.

Polymers, copolymers or mixtures of polymers which are impact-resistant and at the same time resistant to aging are also obtained by mixing a component which is elastomeric at room temperature and which is slightly crosslinked with a homopolymer or copolymer obtained from monomers which when polymerized by themselves form hard and brittle polymers, or by polymerizing the monomers which form the hard component in the presence of slightly crosslinked rubber polymers or rubber polymers which crosslink under the reaction conditions. Another possibility for obtaining thermoplastic molding materials which are impact-resistant and at the same time resistant to aging consists in mixing a hard and brittle polymer with a polymer which is elastomeric at room temperature so that functional groups which are present in the polymers and are capable of reacting with each other with the formation of main valence, do in fact react. In such mixtures the hard component is intermolecularly crosslinked with the soft component. In this prior art method, the soft components used are preferably such as contain only very small amounts of dienes in polymerized form or none at all.

Although impact-resistant molding materials which have great industrial interest are obtained by the said prior art methods, they have certain defects. Their application in practice is subject to certain limitations. Thus in practice a surface is required which is hard, homogeneous and glossy, coupled with an outstanding resistance to aging, i.e. resistance to the influence of heat, oxygen, light and climatic fluctuations.

We have now found that impact-resistant thermoplastic molding materials which have a combination of the properties above outlined which are required in practice are obtained when a copolymer I is first prepared from A. 50 to 85% by weight of acrylic esters having four to eight carbon atoms in the alcohol component;
B. 5 to 20% by weight of acrylonitrile and
C. 10 to 40% by weight of vinyl alkyl ethers (the alkyl group containing one to eight carbon atoms)

the sum of the percentages being 100, by polymerizing the monomers in aqueous emulsion, then 90 to 10% by weight (with reference to copolymer I) of styrene and acrylonitrile in the ratio 60:40 to 90:10 is added to the aqueous dispersion of copolymer I and polymerized to form a component II, and component II is mixed with such an amount of a copolymer III of styrene and acrylonitrile in the ratio 60:40 to 90:10 that 10 to 35% by weight (with reference to the solids content of the whole mixture) of copolymer I is contained in the polymer mixture obtained.

The first stage in the process according to this invention is the preparation of a copolymer I by polymerization of certain monomers in aqueous emulsion. The comonomers forming this copolymer I should be (A) acrylic esters having four to eight carbon atoms in the alcohol component, (B) acrylonitrile and (C) vinyl alkyl ethers with one to four carbon atoms in the alkyl group, and 50 to 85%, preferably 60 to 70% by weight of (A), 5 to 20%, preferably 8 to 12% by weight of (B) and 10 to 40%, preferably 15 to 30% by weight of (C) should participate in the constitution of the copolymer. Examples of acrylic esters having four to eight carbon atoms in the alcohol component are n-butyl acrylate, tertiary-butyl acrylate, hexyl acrylate and ethylcyclohexyl acrylate. Mixtures of these esters in the stated amounts may also be used.

Vinyl methyl ether is preferably used as the vinyl alkyl ether forming component (C), but vinyl ethyl ether, vinyl butyl ether, vinyl isobutyl ether or the ethers of higher alcohols having up to eight carbon atoms may also be used.

Copolymerization of the comonomers forming component I may be carried out by any conventional method and does not form part of the subject-matter of the present invention. Conventional emulsifiers, such as sodium salts of paraffinsulfonic acids having twelve to eighteen carbon atoms, aryl sulfonates, sodium salts of fatty acids having about sixteen to eighteen carbon atoms, fatty alcohol sulfates having about twelve to eighteen carbon atoms and similar emulsifiers may be used in amounts of about 0.1 to 3% by weight, and in general water-soluble compounds forming free radicals, such as persulfates, peroxides or hydroperoxides, or also azo compounds, may be used as polymerization initiators.

It is possible to polymerize small amounts of crosslinking monomers, for example butanediol diacrylate or divinylbenzene, with the monomers (A), (B) and (C) within the scope of the present invention.

Styrene and acrylonitrile in the ratio 60:40 to 90:10 are then polymerized onto copolymer I in aqueous emulsion. Usually styrene and acrylonitrile are added to the dispersion of copolymer I, if desired after further emulsifier and polymerization initiator have been added. The polymerization initiators used in this second polymerization stage are preferably soluble in the monomers, i.e. initiators which are soluble in styrene and acrylonitrile, such as organic peroxides and azo compounds, for example benzoyl peroxide, lauroyl peroxide or azodiisobutyrodinitrile. It is often advantageous to use small amounts of water-soluble polymerization initiators additionally in the second stage of the process.

The amount of emulsifier in the first polymerization stage for the production of copolymer I is advantageously chosen initially so that it is not necessary to add further emulsifier for polymerizing the styrene and acrylonitrile onto copolymer I. Styrene and acrylonitrile are polymerized onto the copolymer in amounts of 90 to 10% by weight with reference thereto. This relatively wide range is due to the possibilities of variations in the process. The amount of styrene and acrylonitrile and to a certain extent also the ratio of the components in the mixture of styrene and acrylonitrile may be dependent on the quantitative composition of copolymer I and the nature of the monomers taking part in the formation of copolymer I. It is however also possible to influence the degree of grafting, i.e. the extent to which styrene and acrylonitrile are grafted onto the preformed copolymer I, by the amounts in which styrene and acrylonitrile are polymerized onto the copolymer I, together with the other reaction conditions, such as temperature and the like. These amounts are however also dependent on the third process stage which is described later.

Component II, which is formed by polymerizing and grafting on styrene and acrylonitrile to copolymer I, is mixed according to this invention with a copolymer III of styrene and acrylonitrile, the ratio of styrene to acrylonitrile again being 60:40 to 90:10. Mixing component II with copolymer III may be carried out in various ways. A preferred method is adding an aqueous dispersion of component II to a suspension in methanol of copolymer III. Particularly uniform mixing of the polymers is achieved in this way.

It is also possible to mix the aqueous dispersion of component II with an aqueous dispersion of copolymer III, to effect coprecipitation of the combined dispersions and to evaporate them to dryness jointly.

Furthermore the polymers in powdered form may be mixed together in an extruder or on mixing rolls.

The amounts in which copolymer III of styrene and acrylonitrile is mixed with component II are variable and depend on the preparation of component II. To achieve high quality molding materials which exhibit the properties above described, it is essential that 10 to 35% by weight of the elastomeric component I is contained in the whole mixture.

The invention is further illustrated by the following examples. The parts specified in the examples are parts by weight.

*Example 1*

*Polymer I.*—29 parts of vinyl methyl ether, 6 parts of butyl acrylate, 1 part of acrylonitrile and 0.1 part of butanediol diacrylate in 200 parts of water are heated with stirring to 65° C. with an addition of 1 part of the sodium salt of a paraffinsulfonic acid ($C_{12}$ to $C_{18}$) and 0.3 part of potassium persulfate. After the polymerization has been initiated, a mixture of 54 parts of butyl acrylate, 9 parts of acrylonitrile and 0.9 part of butanediol diacrylate is added within three hours. After all the monomers have been added, the polymerization mixture is kept at 65° C. for another sixty minutes. An about 33% aqueous polymer dispersion is obtained.

*Polymer II.*—300 parts of the dispersion of polymer I is mixed with 35 parts of a mixture of styrene and acrylonitrile in the weight ratio 75:25 and 70 parts of water and polymerized at 80° C. while stirring. 0.15 part of lauroyl peroxide, dissolved in the mixture of styrene and acrylonitrile, is used as the polymerization initiator. An aqueous about 33% polymer dispersion is obtained.

*Polymer III.*—300 parts of aqueous dispersion of polymer II is precipitated with 265 parts of a copolymer of styrene and acrylonitrile in the ratio 75:25 which is suspended in 800 parts of methanol. The solid product obtained is separated, dried and granulated in a screw extruder. Injection moldings prepared from this material have excellent surface gloss and good scratch resistance. The products are practically unchanged after a weathering period of one year.

The notched impact strength of test bars molded from the product is 16 cm. kg. cm.$^{-2}$; the softening point is about 100° C.

*Example 2*

*Polymer I.*—23.5 parts of vinyl methyl ether, 64.5 parts of butyl acrylate, 11 parts of acrylonitrile and 1 part of butanediol diacrylate are polymerized while stirring at 65° C. in 200 parts of water with an addition of 1 part of the sodium salt of a paraffinsulfonic acid ($C_{12}$–$C_{18}$) and 0.3 part of potassium persulfate. The whole of the vinyl ether and one fifth of the remaining mixture of monomers together with water, the emulsifier and the catalysts are used for commencing the polymerization and the remaining four fifth of the mixture of monomers (butyl acrylate, acrylonitrile and butanediol diacrylate) is added within five hours. When the polymerization is over, an about 33% aqueous polymer dispersion is obtained.

*Polymer II.*—The production of polymer II is carried out as in Example 1. As may be seen from the following table, various amounts of a mixture of styrene and acrylonitrile are used. By adding 200 parts of water and 100 parts of the mixture of monomers (styrene and acrylonitrile), the percentage content of the dispersion obtained is kept at 33% in each case. 0.3% of lauroyl peroxide (with reference to the amount of the mixture of styrene and acrylonitrile monomers) is used as polymerization initiator.

| Percentage amount of styrene/acrylonitrile with reference to polymer I (polymer II) | Ratio of styrene to acrylonitrile (polymers II and III) | Amount of polymer in polymer III | Impact strength (notched) of test bar cm. kg./sq. cm. (polymer III) |
|---|---|---|---|
| 50 | 75:25 | 25 | 4.5 |
| 40 | 75:25 | 25 | 6.8 |
| 33.3 | 75:25 | 25 | 9.3 |
| 25 | 75:25 | 25 | 19.7 |
| 20 | 75:25 | 25 | 19.7 |
| 33.3 | 70:30 | 25 | 12.3 |
| 33.3 | 78:22 | 25 | 8.7 |
| 33.3 | 75:25 | 30 | 20.1 |
| 33.3 | 75:25 | 25 | 9.3 |
| 33.3 | 75:25 | 20 | 5.6 |
| 33.3 | 75:25 | 15 | 2.5 |

*Polymer III.*—The production of polymer III is carried out as described in Example 1. The amount used for precipitation is regulated so that the percentage contents of polymer I set out in the table are present in polymer III.

*Example 3*

*Polymer I.*—Production of polymer I is carried out as in Example 2. The composition of the monomers to be polymerized, however, is 23.5 parts of vinyl methyl ether, 68 parts of butyl acrylate, 7.5 parts of acrylonitrile and 1 part of butanediol diacrylate.

*Polymers II and III.*—The production of polymers II and II is carried out as described in Example 1.

The product obtained has an impact strength (notched) of molded test bars of 7.8 cm. kg./sq. cm.; softening point 98° C.

*Example 4*

*Polymer I.*—Production of polymer I is carried out as in Example 2. The composition of the monomers, however, is 17.5 parts of vinyl methyl ether, 66.5 parts of butyl acrylate, 15 parts of acrylonitrile and 1 part of butanediol diacrylate.

*Polymers II and III.*—Polymers II and III are prepared in ways analogous to those described in Example 1. The impact strength (notched) of test bars made from the resultant product is 14.6 cm. kg./sq. cm. The softening point is 99° C.

*Example 5*

*Polymer I.*—Polymer I is prepared from 23.5 parts of vinyl isobutyl ether, 64.5 parts of butyl acrylate, 11 parts of acrylonitrile and 1 part of butanediol diacrylate. This mixture of monomers is polymerized as described in Example 2.

*Polymers II and III.*—Polymers II and III are prepared as described in Example 1.

The impact strength (notched) of molded test bars is 7.8 cm. kg./sq. cm. The softening point is 96° C.

We claim:
1. A process for the production of impact resistant thermoplastic molding materials which comprises: preparing a copolymer I consisting essentially of:
 (A): 50 to 85% by weight of acrylic esters having from four to eigth carbon atoms in the alcohol component,
 (B): 5 to 20% by weight of acrylonitrile and
 (C): 10 to 40% by weight of vinyl alkyl ethers having one to four carbon atoms in the alkyl group
the sum of the percentages being 100, by polymerizing the monomers in aqueous emulsion; adding 90 to 10% by weight with reference to the copolymer I of styrene and acrylonitrile in the weight ratio 60:40 to 90:10 to said copolymer I and polymerizing the mixture thus obtained in aqueous dispersion to form a copolymer II; and then uniformly mixing copolymer II with a copolymer III of styrene and acrylonitrile in the weight ratio 60:40 to 90:10 in such proportions that 10 to 35% by weight with reference to the solids content of the whole mixture of the elastomeric copolymer I are contained in the resultant mixture.

2. A process as claimed in claim 1 wherein the copolymer I is prepared from 60 to 70% of component (A), 8 to 12% of component (B) and 15 to 30% of component (C), the sum of the percentages being 100.

3. An impact resistant thermoplastic molding material comprising a uniform mixture of
 (a) a copolymer II prepared by polymerizing (1) an elastomeric copolymer I of
  (A) 50 to 85% by weight of an acrylic ester having from four to eight carbon atoms in the alcohol component,
  (B) 5 to 20% by weight of acrylonitrile, and
  (C) 10 to 40% by weight of a vinyl alkyl ether having one to four carbon atoms in the alkyl group, the sum of the percentages being 100,
 in an aqueous dispersion with (2) styrene and acrylonitrile in the weight ratio 60:40 to 90:10 in an amount of 90 to 10% by weight with reference to the copolymer I; and
 (b) a copolymer III of styrene and acrylonitrile in the weight ratio 60:40 to 90:10, in such proportions of components (a) and (b) that the elastomeric copolymer I constitutes 10 to 35% by weight of the resultant uniform mixture.

4. An impact resistant thermoplastic molding material as claimed in claim 3 wherein the elastomeric copolymer I is a copolymer of 60 to 70% by weight (A), 8 to 12% by weight (B) and 15 to 30% by weight (C), the sum of the percentages being 100.

5. An impact resistant thermoplastic molding material as claimed in claim 3 wherein the elastomeric copolymer I is a copolymer of (A) butyl acrylate, (B) acrylonitrile and (C) vinyl methyl ether.

6. An impact resistant thermoplastic molding material as claimed in claim 3 wherein the elastomeric copolymer I is a copolymer of (A) butyl acrylate, (B) acrylonitrile and (C) vinyl isobutyl ether.

References Cited by the Examiner

UNITED STATES PATENTS

| | | | |
|---|---|---|---|
| 2,698,313 | 12/1954 | Daly | 260—898 |
| 2,835,646 | 5/1958 | Sell | 260—898 |
| 3,041,307 | 6/1962 | Baer | 260—29.6 |

MURRAY TILLMAN, *Primary Examiner.*

J. WHITE, *Assistant Examiner.*